United States Patent
Sreevidhas et al.

(10) Patent No.: US 10,962,036 B2
(45) Date of Patent: Mar. 30, 2021

(54) CABINET PANEL INTERLOCKS FOR APPLIANCE

(71) Applicant: Haier US Appliance Solutions, Inc., Wilmington, DE (US)

(72) Inventors: Jebasingh Sreevidhas, Louisville, KY (US); Christopher Gene Vowels, Cox's Creek, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 18 days.

(21) Appl. No.: 16/426,031

(22) Filed: May 30, 2019

(65) Prior Publication Data

US 2020/0378416 A1    Dec. 3, 2020

(51) Int. Cl.
*F16B 5/00* (2006.01)
*D06F 39/12* (2006.01)

(52) U.S. Cl.
CPC .............. *F16B 5/008* (2013.01); *D06F 39/12* (2013.01)

(58) Field of Classification Search
CPC ......... Y10T 403/7015; Y10T 403/7043; Y10T 403/7045; F16B 5/008; F16B 12/38; F16B 12/26; F16B 5/0607; D06F 39/12; B65D 7/12; B65D 7/24; B65D 7/30; B65D 11/18; B65D 11/1866; B65D 11/1873; A47B 47/025; A47B 47/02
USPC ...... 312/236, 265.5, 265.6, 257.1, 263, 228; 220/4.28, 615, 682, 690; 134/58 D; 68/3 R
See application file for complete search history.

(56) References Cited

U.S. PATENT DOCUMENTS

| | | | | | |
|---|---|---|---|---|---|
| 2,265,618 | A | * | 12/1941 | Adams | B65D 7/24 220/4.28 |
| 2,902,166 | A | * | 9/1959 | Bahr | A47B 47/02 211/11 |
| 3,065,451 | A | * | 11/1962 | Rutter | H01R 13/115 439/849 |
| 3,295,902 | A | * | 1/1967 | Doutt | A47B 47/025 312/108 |
| 3,548,425 | A | * | 12/1970 | Goldstein | F16B 12/34 5/299 |
| 3,672,531 | A | * | 6/1972 | Balven | B65D 7/24 220/4.28 |

(Continued)

FOREIGN PATENT DOCUMENTS

| | | | |
|---|---|---|---|
| DE | 102011007441 | * | 10/2012 |
| EP | 2772693 A1 | | 9/2014 |
| EP | 2778275 B1 | | 9/2014 |

*Primary Examiner* — Janet M Wilkens
(74) *Attorney, Agent, or Firm* — Dority & Manning, P.A.

(57) ABSTRACT

An appliance that includes a cabinet having a base panel interlocked with a side panel is provided. The base panel includes interlocking features, including an interlock housing defining a tab receiving slot and an interlock projection projecting upward from the base panel. The side panel includes a panel body and a mounting flange extending from the panel body. The side panel also includes interlocking features, including a locking tab extending from the mounting flange. Further, the mounting flange defines a locking slot. To interlock the side panel with the base panel, the locking tab of the side panel is received within the tab receiving slot of the interlock housing of the base panel and the interlock projection is received within the locking slot of the mounting flange of the side panel.

18 Claims, 13 Drawing Sheets

(56) References Cited

U.S. PATENT DOCUMENTS

| | | | | |
|---|---|---|---|---|
| 3,675,955 A | * | 7/1972 | Hajduk | F16B 12/26 |
| | | | | 217/65 |
| 4,135,837 A | * | 1/1979 | Suttles | A47B 47/024 |
| | | | | 403/245 |
| 4,148,454 A | * | 4/1979 | Carlson | F16B 12/38 |
| | | | | 108/152 |
| 4,391,545 A | * | 7/1983 | Zummer | F16B 7/0446 |
| | | | | 403/189 |
| 4,479,737 A | * | 10/1984 | Bergh | B65D 55/02 |
| | | | | 220/690 |
| 4,572,596 A | * | 2/1986 | Weir | D06F 39/12 |
| | | | | 312/210 |
| 4,692,987 A | | 9/1987 | Cuthbert et al. | |
| 4,840,285 A | * | 6/1989 | Carr | D06F 58/04 |
| | | | | 220/4.02 |
| 5,893,616 A | * | 4/1999 | MacDonald | A47B 47/02 |
| | | | | 312/245 |
| 5,908,229 A | * | 6/1999 | Wetherholt | A47B 47/02 |
| | | | | 312/263 |
| 7,494,197 B2 | * | 2/2009 | Han | D06F 39/12 |
| | | | | 312/228 |
| 2002/0159831 A1 | | 10/2002 | Williamson | |
| 2005/0150259 A1 | * | 7/2005 | Hwang | D06F 39/12 |
| | | | | 68/3 R |
| 2018/0106284 A1 | * | 4/2018 | Bickers | F16B 2/241 |

\* cited by examiner

CABINET PANEL INTERLOCKS FOR APPLIANCE

FIELD OF THE INVENTION

The present subject matter relates generally to consumer appliances, and more particularly to cabinet panels equipped with interlock features.

BACKGROUND OF THE INVENTION

Many consumer appliances include cabinets or outer housings. The cabinet can provide a structural outer shell of the appliance and can house various internal components. For instance, dryer appliances typically include a cabinet with a drum rotatably mounted therein. During operation, a motor rotates the drum, e.g., to tumble articles located within a chamber defined by the drum. An air handler or blower moves air heated by a heater assembly through the chamber in order to dry moisture-laden articles positioned therein. Such components are housed within the cabinet.

In some instances, cabinets for consumer appliances are made up of two or more panels that are connected together during assembly. For instance, a cabinet for a consumer appliance can include at least one side panel connected to a bottom or base panel. Conventionally, assembly of such panels has required a minimum of three operators to change the orientation of the cabinet assembly so that all of the screws to connect the side panel with the base panel can be properly accessed and driven. Furthermore, in some instances, ten or more screws have been required to connect a side panel with a base panel. Consequently, assembly of such panels has conventionally presented a number of challenges.

Accordingly, an appliance having a cabinet that addresses one or more of the challenges noted above would be desirable.

BRIEF DESCRIPTION OF THE INVENTION

Aspects and advantages of the invention will be set forth in part in the following description, or may be obvious from the description, or may be learned through practice of the invention.

In one aspect, an appliance is provided. The appliance includes a cabinet having a base panel and a side panel connected with the base panel. The base panel has a base body that has a top surface and a bottom surface, an interlock housing defining a tab receiving slot, and an interlock projection projecting from the top surface. The side panel has a panel body and a mounting flange extending from the panel body, the mounting flange defining a locking slot and having a locking tab extending therefrom. Further, the locking tab of the side panel is received within the tab receiving slot of the interlock housing of the base panel and the interlock projection is received within the locking slot of the mounting flange of the side panel.

In another aspect, an appliance defining a vertical direction, a lateral direction, a transverse direction is provided. The appliance includes a base panel having a base body, the base body has an interlock housing defining a tab receiving slot and an interlock projection projecting from the base body along the vertical direction, the interlock housing having a bead projecting downward along the vertical direction into the tab receiving slot. The appliance further includes a side panel having a panel body and a bottom flange extending from the panel body, the bottom flange defining a locking slot and having a locking tab extending therefrom. The locking tab of the side panel is received within the tab receiving slot of the interlock housing of the base panel and engaged with the bead and wherein the interlock projection is received within the locking slot of the bottom flange of the side panel.

In yet another aspect, a method of assembling a cabinet of an appliance is provided. The method includes interlocking a side panel with a base panel such that a locking tab of the side panel is received within a tab receiving slot of the base panel and an interlock projection of the base panel is received within a locking slot of the side panel.

In yet another aspect, a method of assembling a cabinet of an appliance is provided. The method includes interlocking a side panel with a base panel such that a locking tab of the side panel is received within a tab receiving slot of the base panel and an interlock projection of the side panel is received within a receiving slot of the base panel.

In yet another aspect, a method of assembling a cabinet of an appliance is provided. The method includes interlocking a side panel with a base panel such that a locking tab of the base panel is received within a tab receiving slot defined by an interlock flange of the side panel and an interlock projection of the side panel is received within a receiving slot of the base panel.

In yet another aspect, a method of assembling a cabinet of an appliance is provided. The method includes interlocking a side panel with a base panel such that a locking tab of the base panel is received within a tab receiving slot defined by an interlock flange of the side panel and an interlock projection of the base panel is received within a locking slot of the side panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
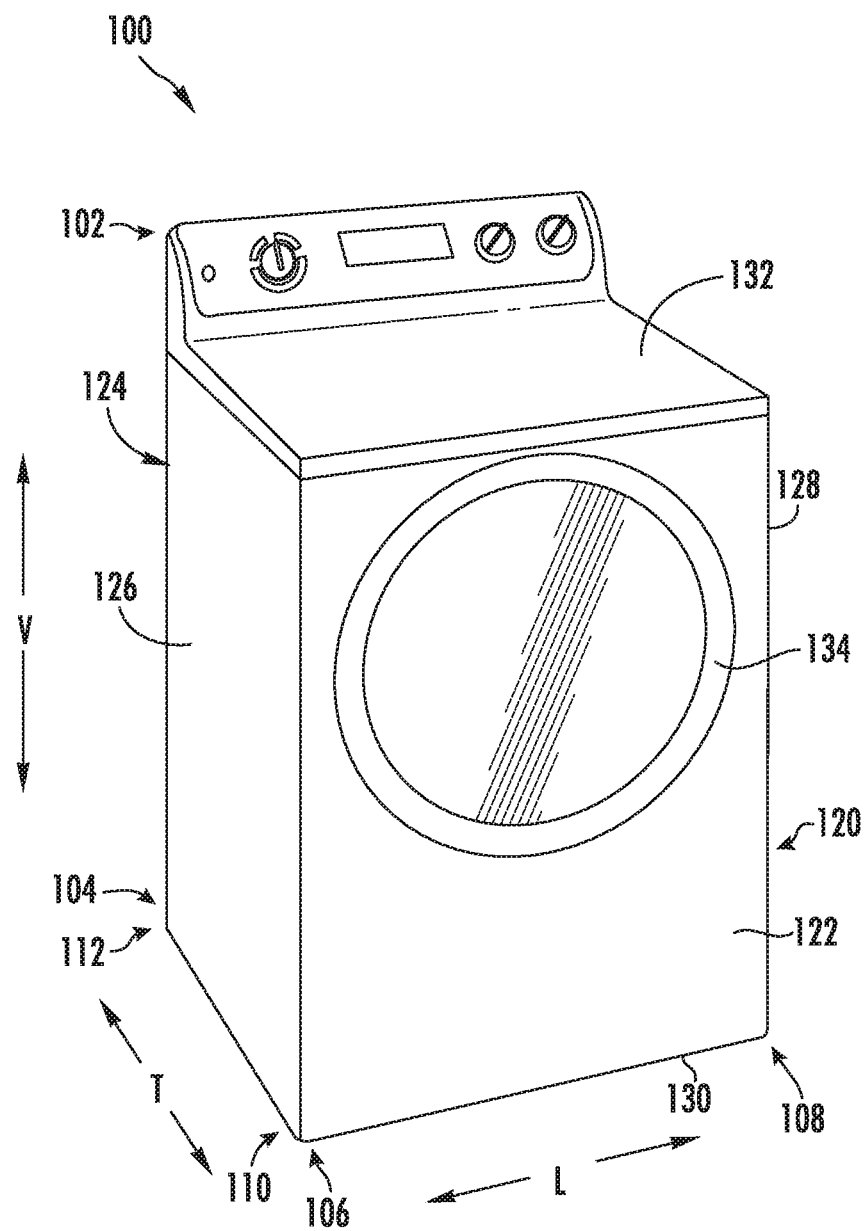
FIG. 1 provides a perspective view of a dryer appliance according to example embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a consumer appliance according to an example embodiment of the present subject matter. Particularly, FIG. 1 provides a perspective view of a dryer appliance 100. While inventive aspects are described herein in the context of a specific embodiment of a dryer appliance, using the teachings disclosed herein it will be understood that dryer appliance 100 is provided by way of example only. Other dryer appliances having different appearances and different features may also be utilized with the present subject matter. Moreover, the inventive aspects disclosed herein can apply to other consumer appliances, including without limitation, a washing machine appliance.

As depicted in FIG. 1, dryer appliance 100 defines a vertical direction V, a lateral direction L, and a transverse direction T. The vertical direction V, lateral direction L, and transverse direction T are mutually perpendicular and form an orthogonal direction system. As used herein, a horizontal direction is a direction orthogonal to the vertical direction V.

Dryer appliance 100 has a cabinet 120. Cabinet 120 extends between a top 102 and a bottom 104 along the vertical direction V, a first side 106 (e.g., left side) and a second side 108 (e.g., right side) along the lateral direction L, and a front 110 and a back 112 along the transverse direction T. Moreover, cabinet 120 includes a front panel 122, a rear panel 124, a pair of side panels 126 and 128 spaced apart from each other by front and rear panels 122 and 124, a bottom or base panel 130, and a top cover 132. Although not depicted, a drum is positioned within the cabinet 120. The drum defines a chamber for receipt of articles, e.g., clothing, linen, etc., for drying. The drum extends between a front portion and a back portion, e.g., along the transverse direction T. The drum is rotatable about an axis of rotation, e.g., about an axis that is parallel to the transverse direction T. A door 134 is rotatably mounted to front panel 122 of cabinet 120 for providing selective access to the drum.

In accordance with example aspects of the present disclosure, interlocking features for connecting panels of a cabinet for a consumer appliance are provided herein. For instance, the interlocking features described herein can be used to connect panels of cabinet 120. In addition, a method of assembling a cabinet of a consumer appliance utilizing such interlocking features is also provided herein. The interlocking features and method of assembly is provided below.

Figure 2:
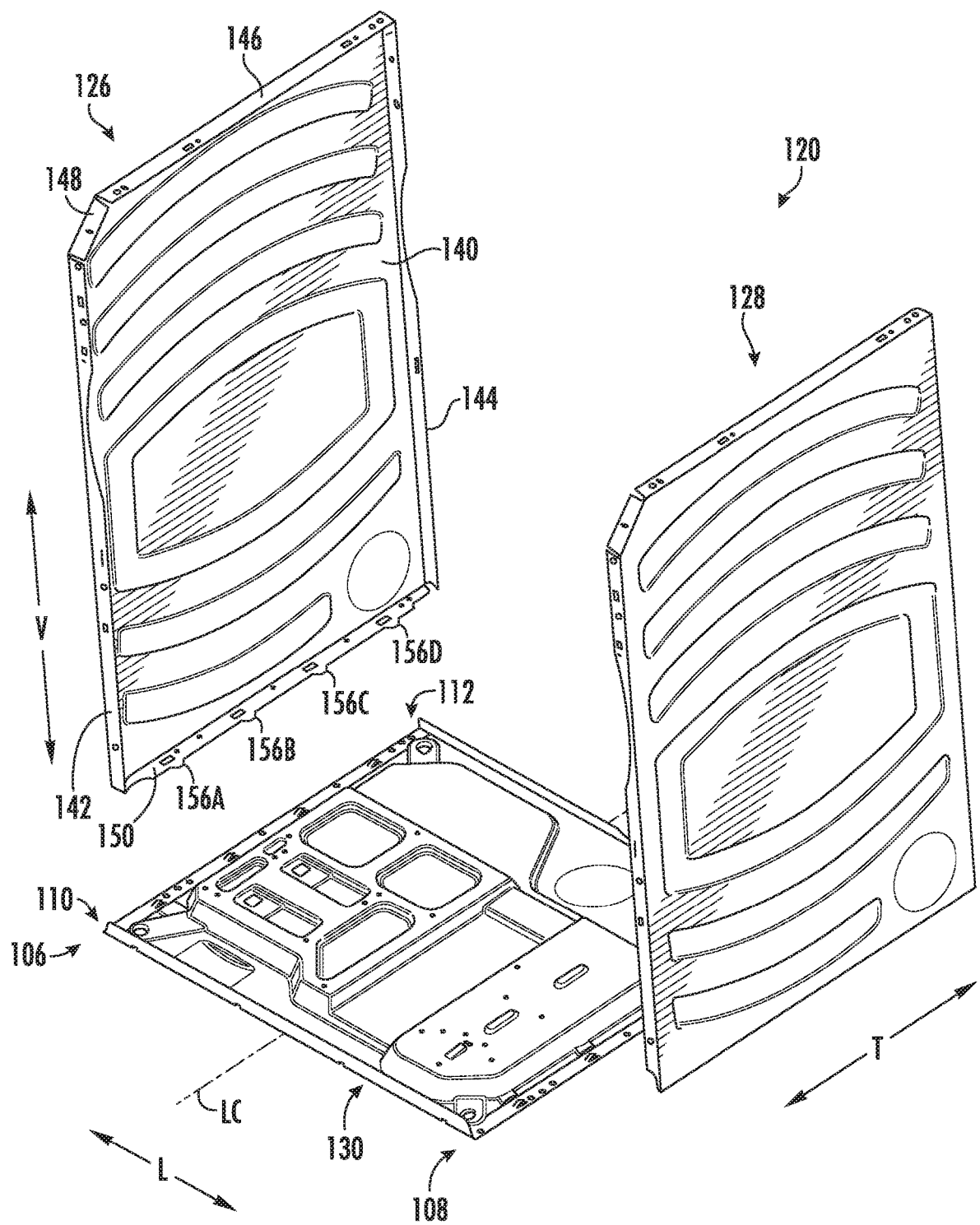
FIG. 2 provides an exploded perspective view of a portion of a cabinet of the dryer appliance of FIG. 1.

FIG. 2 provides an exploded perspective view of a portion of cabinet 120. In FIG. 2, base panel 130, first side panel 126, and second side panel 128 are depicted. First side panel 126 is connectable to base panel 130 at first side 106 and second side panel 128 is connectable to base panel 130 at second side 108. Particularly, as will be explained in greater detail herein, first side panel 126 is connectable with base panel 130 by one or more interlocks and second side panel 128 is connectable with base panel 130 by one or more interlocks.

First side panel 126 forms the left side of cabinet 120 in the depicted embodiment of FIG. 2. First side panel 126 has a panel body 140 that extends generally in a plane orthogonal to the lateral direction L. Various flanges project from panel body 140 of first side panel 126 generally inward along the lateral direction L toward a lateral centerline LC defined by cabinet 120 midway between the first side 106 and second side 108 of cabinet 120. Particularly, a forward flange 142 projects from panel body 140 inward along the lateral direction L toward the lateral centerline LC at the front 110 of cabinet 120. A rear flange 144 projects from panel body 140 inward along the lateral direction L toward the lateral centerline LC at the rear or back 112 of cabinet 120. The forward flange 142 and rear flange 144 both extend in a plane orthogonal to or substantially orthogonal to the transverse direction T. The forward flange 142 and rear flange 144 can connect with front panel 122 (FIG. 1) and rear panel 124 (FIG. 1), respectively. First side panel 126 also includes top flanges 146, 148 projecting from panel body 140 inward along the lateral direction L toward the lateral centerline LC at the top 102 of cabinet 120.

In addition, first side panel 126 includes a mounting flange, which in this embodiment is a bottom flange 150. Bottom flange 150 projects from panel body 140 inward along the lateral direction L toward the lateral centerline LC at bottom 104 of cabinet 120. Generally, bottom flange 150 extends in a plane orthogonal to or substantially orthogonal to the vertical direction V. Bottom flange 150 can connect with base panel 130. Particularly, as will be explained in detail below, bottom flange 150 of first side panel 126 includes various features for interlocking first side panel 126 with base panel 130.

Figure 3:
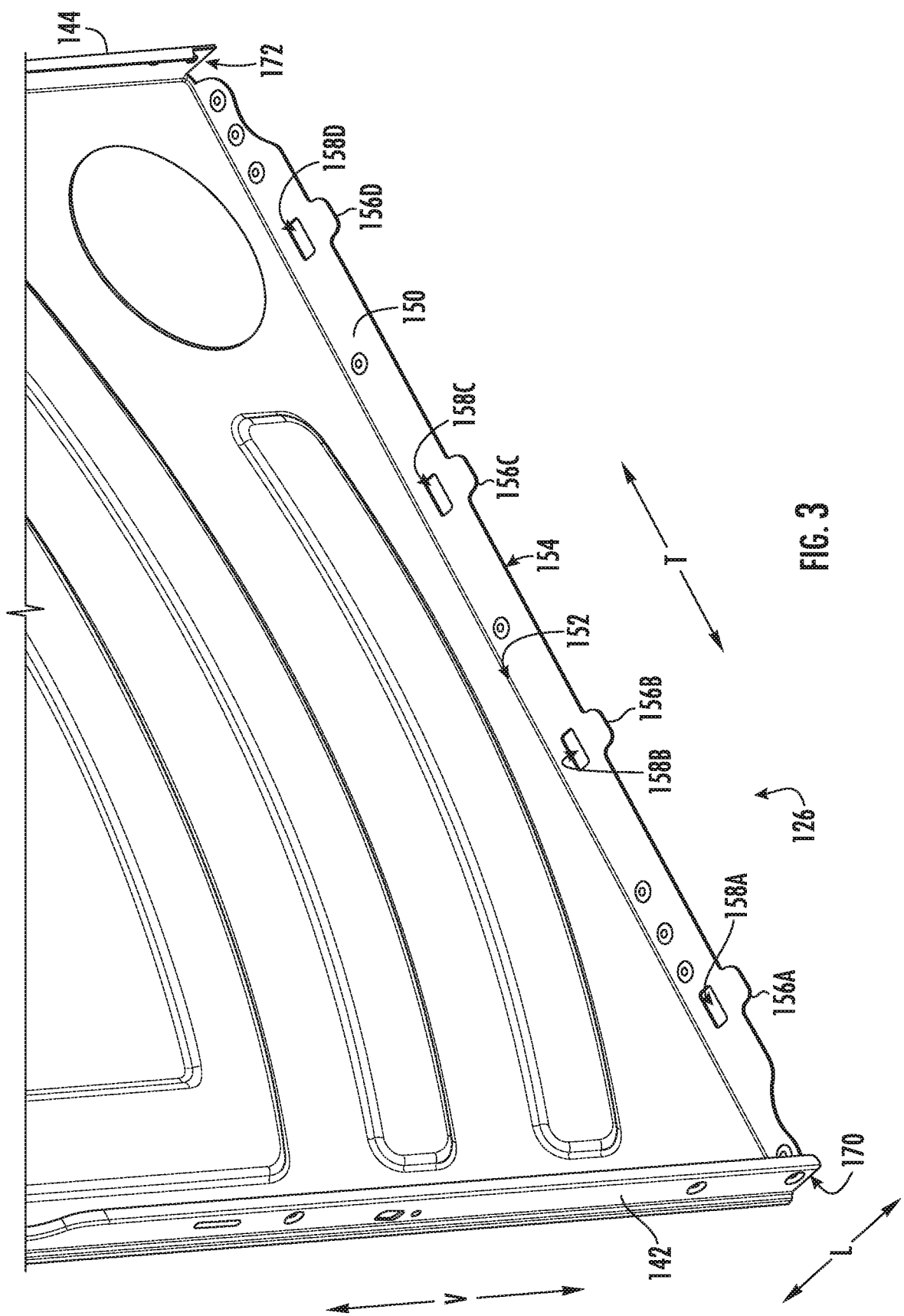
FIG. 3 provides a close up perspective view of a bottom portion of a side panel of the cabinet of FIG. 2 and depicts various interlocking features.

FIG. 3 provides a close up perspective view of a bottom portion of first side panel 126 and depicts various features for interlocking first side panel 126 with base panel 130

(FIG. 2). As depicted, bottom flange 150 extends between a proximal end 152 and a distal end 154 or edge along the lateral direction L. Bottom flange 150 is connected to panel body 140 at its proximal end 152 and the distal end 154 of bottom flange 150 is a free end. Notably, for this embodiment, bottom flange 150 of first side panel 126 includes a plurality of locking tabs extending therefrom, including a first locking tab 156A, a second locking tab 156B, a third locking tab 156C, and a fourth locking tab 156D. Generally, as will be explained in greater detail herein, when first side panel 126 is connected to base panel 130, each locking tab 156A-D is received within a corresponding tab receiving slot of base panel 130 to interlock first side panel 126 with base panel 130.

The locking tabs 156A-D extend from the distal end 154 of bottom flange 150 inward along the lateral direction L toward the lateral centerline LC (FIG. 2). Each locking tab 156A-D extends in a plane generally orthogonal to or substantially orthogonal to the vertical direction V. The locking tabs 156A-D are spaced from one another along the lateral direction L. For this embodiment, the locking tabs 156A-D are evenly spaced from one another along the lateral direction L. In other embodiments, the locking tabs 156A-D need not be evenly spaced from one another along the lateral direction L. Furthermore, while four (4) locking tabs 156A-D are depicted in the illustrated embodiment of FIG. 3, in other embodiments, first side panel 126 can have more or less than four (4) locking tabs. For instance, in some embodiments, first side panel 126 can include a single locking tab projecting or extending from bottom flange 150, e.g., positioned at or substantially at the midpoint between the front 110 and back 112 of cabinet 120. In yet other embodiments, first side panel 126 can include more than four (4) locking tabs.

As further depicted in FIG. 3, bottom flange 150 defines a plurality of locking slots, including a first locking slot 158A, a second locking slot 158B, a third locking slot 158C, and a fourth locking slot 158D. The locking slots 158A-D are sized to receive respective interlock projections of base panel 130 (FIG. 2) as will be explained in greater detail herein. For this embodiment, the locking slots 158A-D are generally rectangular, however, other shapes are possible. Moreover, notably, the locking slots 158A-D are defined by bottom flange 150 outward of the locking tabs 156A-D along the lateral direction L with respect to the lateral centerline LC (FIG. 2) and are also aligned with their respective or corresponding locking tabs 156A-D along the transverse direction T.

Figure 4:
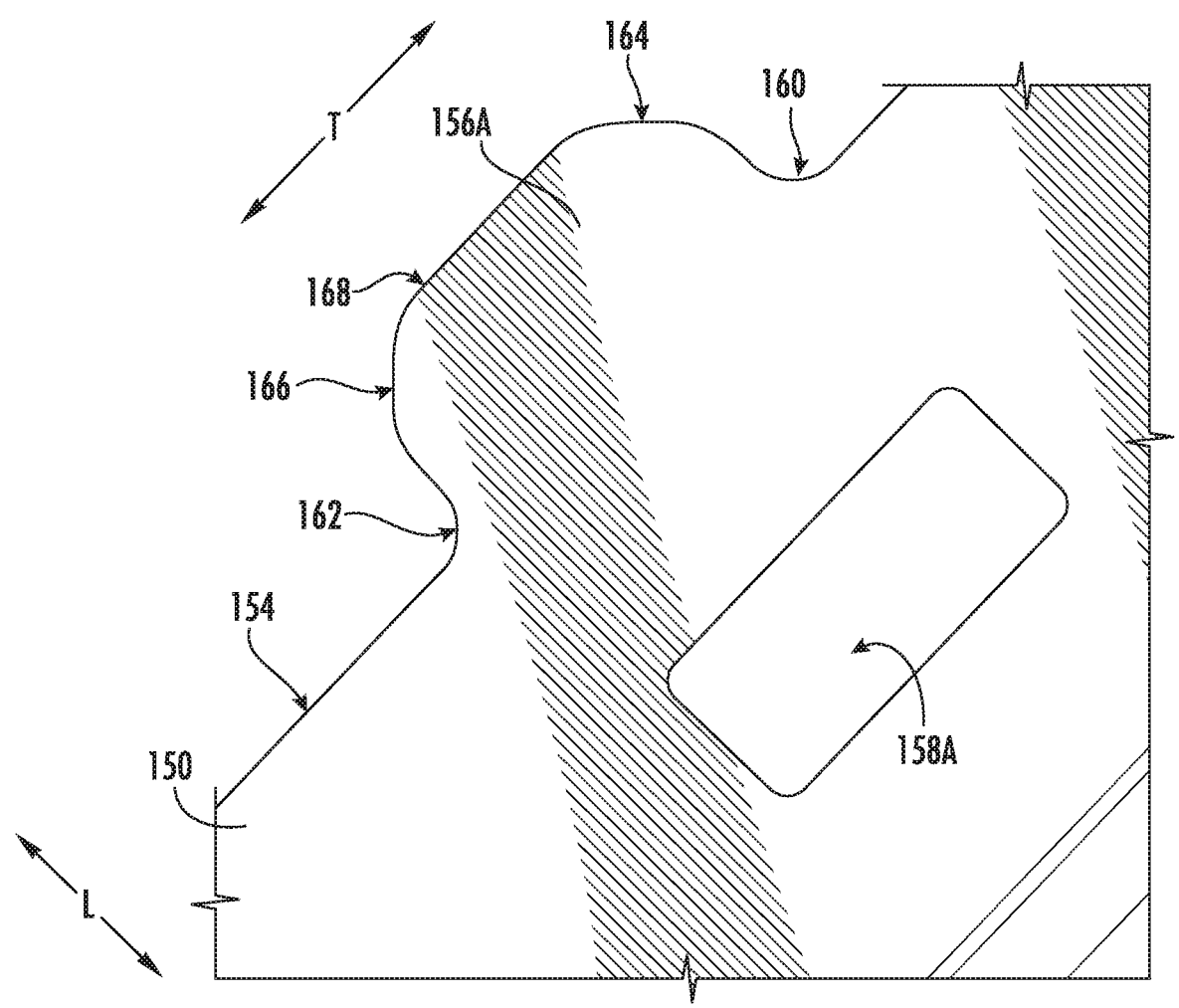
FIG. 4 provides a close up perspective view of one locking tab and locking slot of the side panel of FIG. 3.

FIG. 4 provides a close up perspective view of one of the locking tab 156A-D and its corresponding locking slot 158A-D. Particularly, the first locking tab 156A and its associated first locking slot 158A are depicted. As shown, opposing fillets 160, 162 transition the distal end 154 or edge of bottom flange 150 to the projecting first locking tab 156A. Moreover, the laterally inward side portions of first locking tab 156A include chamfered surfaces 164, 166 that transition the first locking tab 156A to its laterally inner surface 168 or edge. Laterally inner surface 168 extends generally parallel to the lateral direction L. The first locking slot 158A is depicted aligned with the first locking tab 156A along the transverse direction T. The other locking tabs 156B-D can be similarly configured as the first locking tab 156A and the other locking slots 158B-D can be similarly configured as the first locking slot 158A.

Returning to FIG. 3, as shown, forward flange 142 defines one or fastener openings 170, e.g., at a bottom portion thereof. For this embodiment, forward flange 142 defines one fastener opening 170 at or proximate its bottom end. In this way, a fastener (e.g., a screw or bolt) can be moved therethrough to fasten forward flange 142 of first side panel 126 with another panel, such as base panel 130 (FIG. 2). Further, in a similar fashion, rear flange 144 defines one or fastener openings 172, e.g., at a bottom portion thereof. For this embodiment, rear flange 144 defines one fastener opening 172 at or proximate its bottom end. In this way, a fastener (e.g., a screw or bolt) can be moved therethrough to fasten rear flange 144 of first side panel 126 with another panel, such as base panel 130 (FIG. 2).

Returning to FIG. 2, second side panel 128 can be configured in the same or similar manner as first side panel 126, except that second side panel 128 forms the right side of cabinet 120 in the depicted embodiment of FIG. 2. Accordingly, the locking tabs that project from the bottom flange of second side panel 128 extend along the lateral direction L toward the lateral centerline LC in a direction opposite the direction in which the locking tabs 156A-D extend from bottom flange 150 of first side panel 126. In this way, the locking tabs 156A-D of first side panel 126 and the locking tabs of second side panel 128 both extending laterally inward toward the lateral centerline LC, e.g., when properly aligned with base panel 130 as shown in FIG. 2.

Figure 5:
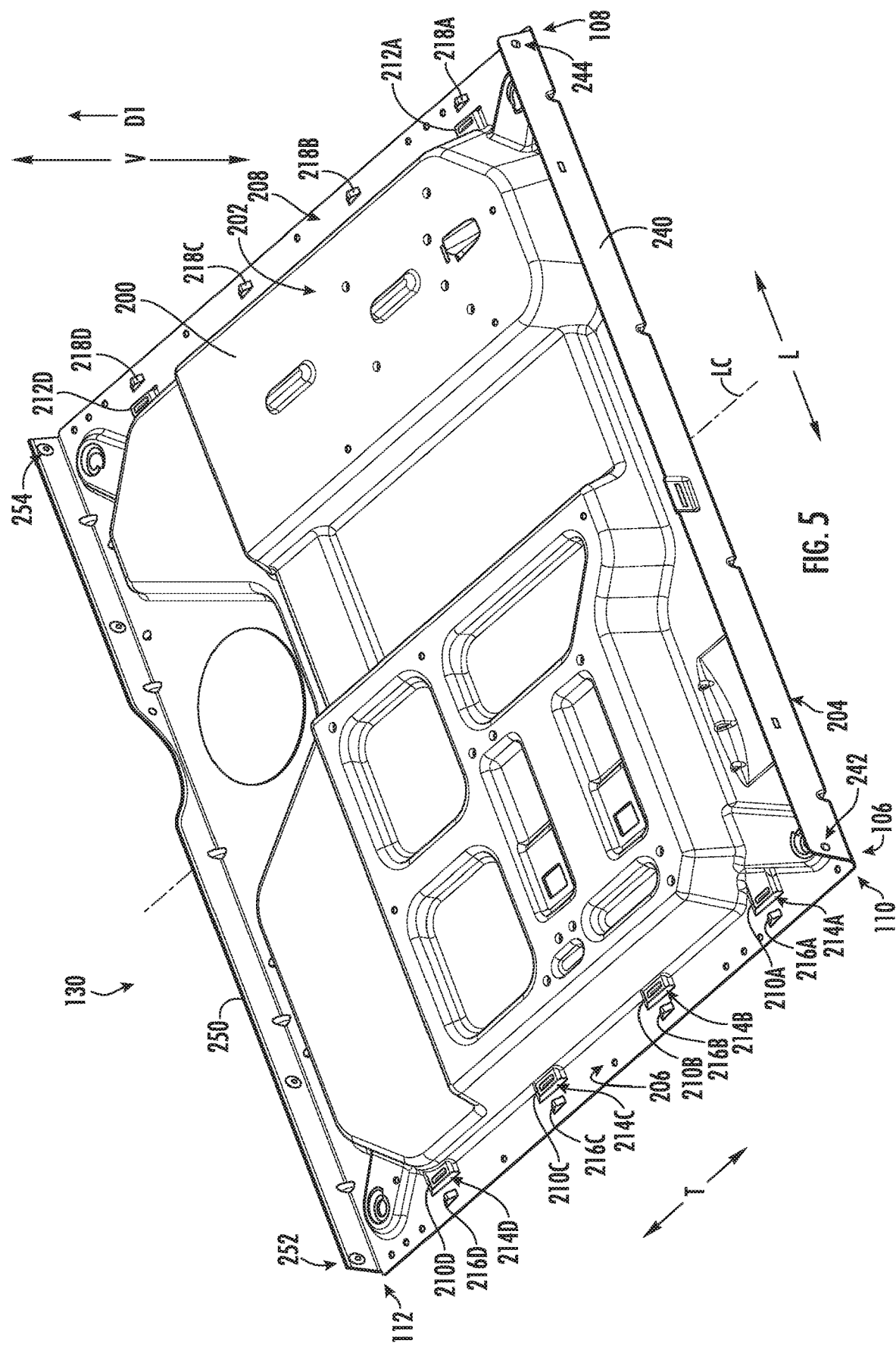
FIG. 5 provides a perspective view of a base panel of the cabinet of FIG. 2.
Figure 9:
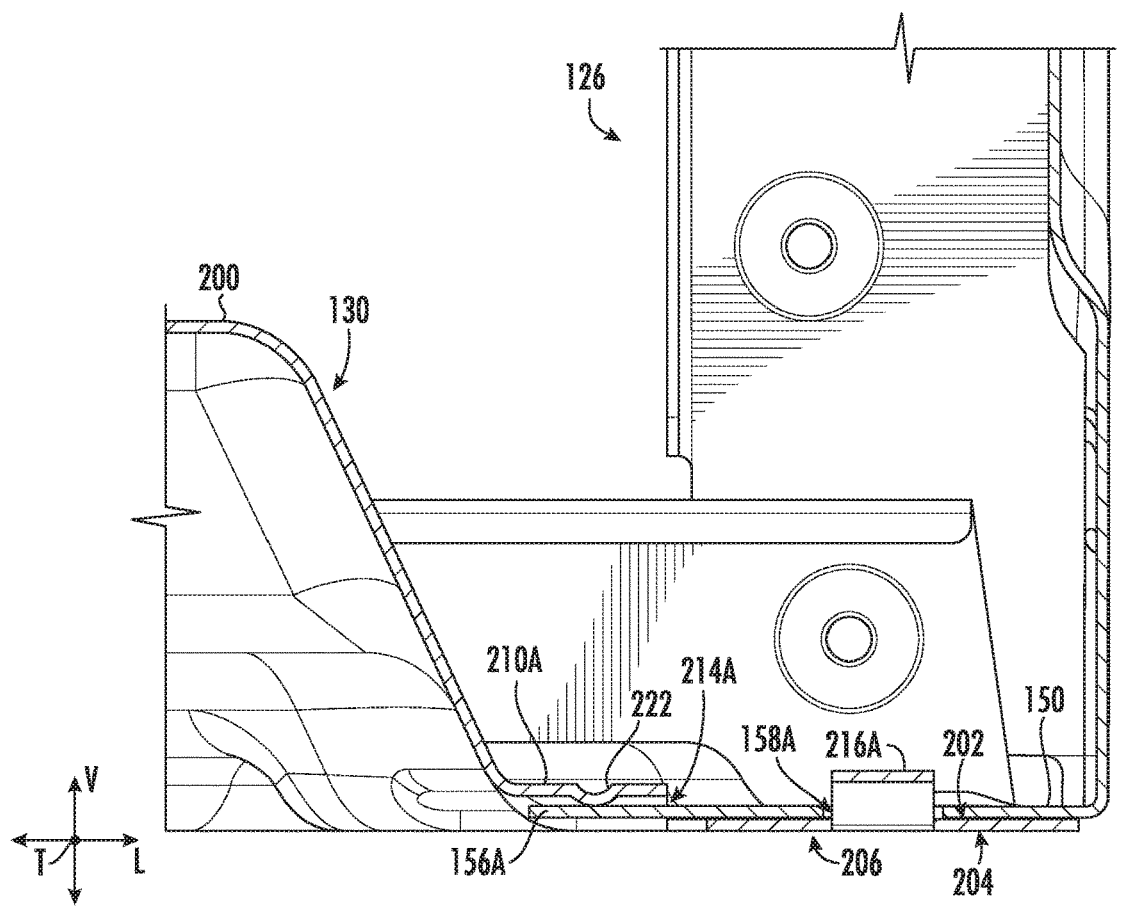
FIG. 9 provides a transverse cross-sectional view of the side panel interlocked with the base panel.

FIG. 5 provides a perspective view of base panel 130. As shown, base panel 130 has a base body 200. Base body 200 has a top surface 202 and a bottom surface 204 (FIG. 9). Generally, base body 200 extends in a horizontal plane. Stated another way, base body 200 extends in a plane generally orthogonal to the vertical direction V, although some portions of base body 200 have different elevations as shown in FIG. 5. Base body 200 has a first mounting plate 206 at the first side 106 and a second mounting plate 208 at the second side 108. Notably, top surface 202 of base body 200 is flat or substantially flat at first mounting plate 206 and at second mounting plate 208. In this way, when first side panel 126 (FIG. 2) is connected with base panel 130, bottom flange 150 of first side panel 126 can be seated on and substantially flush with the top surface 202 of base panel 130 at first mounting plate 206. Moreover, similarly, when second side panel 128 (FIG. 2) is connected with base panel 130, the bottom flange of second side panel 128 can be seated on and substantially flush with the top surface 202 of base panel 130 at second mounting plate 208.

Base panel 130 includes and/or defines a plurality of interlocking features for interlocking base panel 130 with other panels, including first side panel 126 (FIG. 2) and second side panel 128 (FIG. 2), for example. As depicted in FIG. 5, base panel 130 includes a plurality of interlock housings. For this embodiment, base panel 130 includes four (4) interlock housings positioned along the first mounting plate 206 at the first side 106, including a first interlock housing 210A, a second interlock housing 210B, a third interlock housing 210C, and a fourth interlock housing 210D. Further, base panel 130 includes four (4) interlock housings positioned along the second mounting plate 208 at the second side 108, including a first interlock housing 212A, a second interlock housing 212B (hidden in FIG. 5), a third interlock housing 212C (hidden in FIG. 5), and a fourth interlock housing 212D. The interlock housings 210A-D at first side 106 are evenly spaced from one another along the transverse direction T. Further, the interlock housings 210A-D at first side 106 are spaced from one another the same or substantially the same distances as the locking tabs 156A-D (FIG. 3) of first side panel 126 are spaced from one another along the transverse direction T. The interlock housings 212A-D at second side 108 are spaced in the same or similar manner as the interlock housings 210A-D at first side 106.

Each interlock housing 210A-D, 212A-D defines a tab receiving slot. For instance, first interlock housing 210A defines a first tab receiving slot 214A, second interlock housing 210B defines a second tab receiving slot 214B, third interlock housing 210C defines a third tab receiving slot 214C, and fourth interlock housing 210D defines a fourth tab receiving slot 214D. Although not shown in FIG. 5, the interlock housings 212A-D at second side 108 can define tab receiving slots in the same or similar manner as the interlock housings 210A-D at first side 106 define their respective tab receiving slots 214A-D. The tab receiving slots are each sized and configured to receive a respective locking tab (e.g., of either the first side panel 126 or second side panel 128). For instance, first tab receiving slot 214A defined by first interlock housing 210A is sized and configured to receive first locking tab 156A (FIG. 3), second tab receiving slot 214B defined by second interlock housing 210B is sized and configured to receive second locking tab 156B (FIG. 3), third tab receiving slot 214C defined by third interlock housing 210C is sized and configured to receive third locking tab 156C (FIG. 3), and fourth tab receiving slot 214D defined by fourth interlock housing 210D is sized and configured to receive fourth locking tab 156D (FIG. 3). The tab receiving slots defined by the interlock housings disposed along the second side 108 of base panel 130 can receive respective locking tabs of second side panel 128 (FIG. 2), e.g., in the same or similar manner described above.

As further depicted in FIG. 5, base panel 130 includes a plurality of interlock projections projecting from the top surface 202 of base panel 130 along a first direction D1, which is an upward direction along the vertical direction V in this embodiment. Particularly, at first side 106, base panel 130 includes a first interlock projection 216A, a second interlock projection 216B, a third interlock projection 216C, and a fourth interlock projection 216D. Each of the interlock projections 216A-D are aligned with their associated interlock housings 210A-D along the transverse direction T. Furthermore, each interlock projection 216A-D is positioned laterally outward of its associated interlock housings 210A-D along the lateral direction L with respect to the lateral centerline LC. At second side 108, base panel 130 includes a first interlock projection 218A, a second interlock projection 218B, a third interlock projection 218C, and a fourth interlock projection 218D. Each of the interlock projections 218A-D are aligned with their associated interlock housings 212A-D along the transverse direction T. Furthermore, each interlock projection 218A-D is positioned laterally outward of its associated interlock housings 210A-D along the lateral direction L with respect to the lateral centerline LC.

Each interlock projection 216A-D, 218A-D is configured to be received within a respective locking slot (e.g., of either the first side panel 126 or second side panel 128). For instance, first interlock projection 216A is configured to be received or receivable within first locking slot 158A of first side panel 126 (FIG. 3), second interlock projection 216B is configured to be received or receivable within second locking slot 158B of first side panel 126 (FIG. 3), third interlock projection 216C is configured to be received or receivable within third locking slot 158C of first side panel 126 (FIG. 3), and fourth interlock projection 216D is configured to be received or receivable within fourth locking slot 158D of first side panel 126 (FIG. 3). The interlock projections 218A-D at second side 108 of base panel 130 are likewise configured to be received within a respective locking slot of second side panel 128 (FIG. 2).

Figure 6:
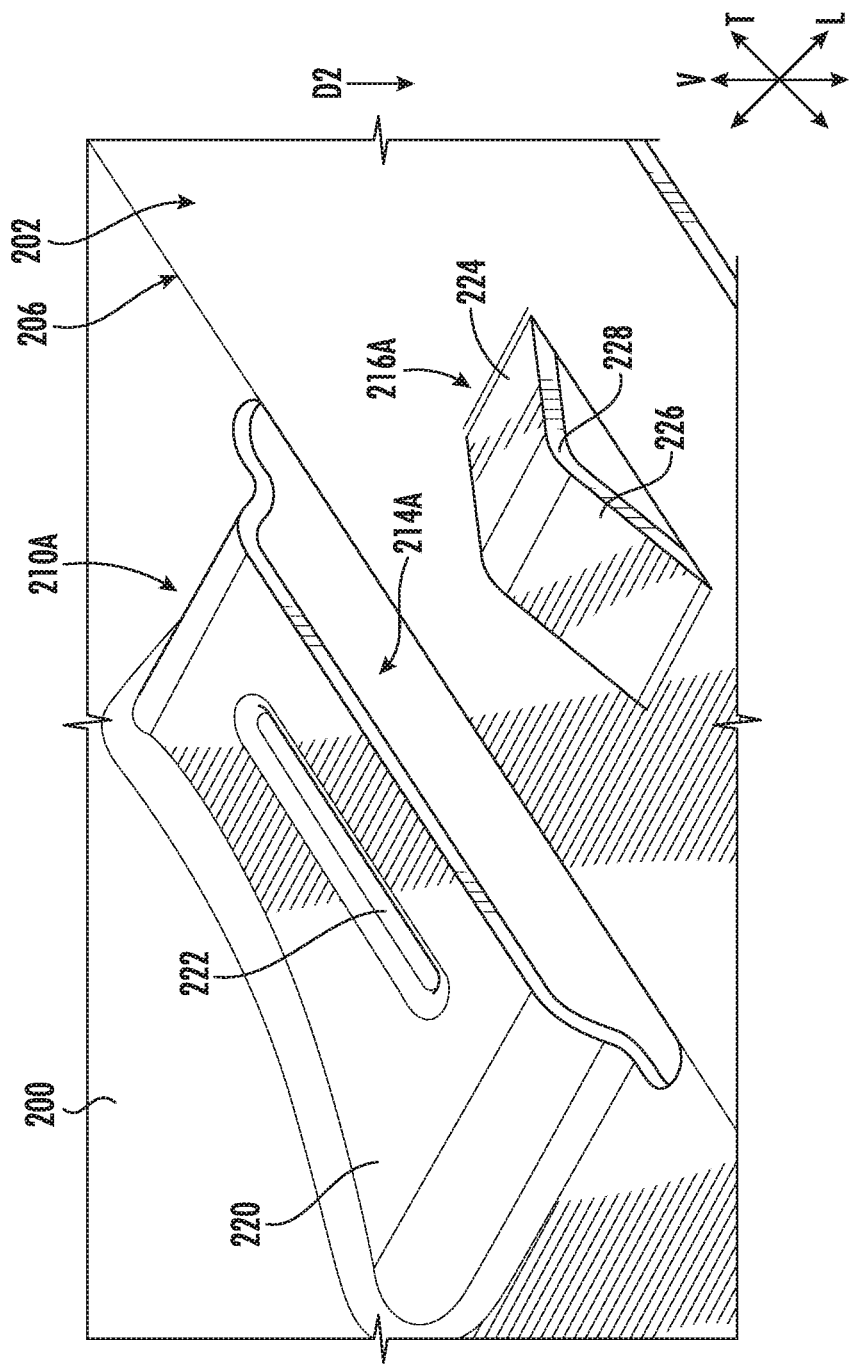
FIG. 6 provides a close up perspective view of interlocking features of the base panel of FIG. 5.
Figure 7:
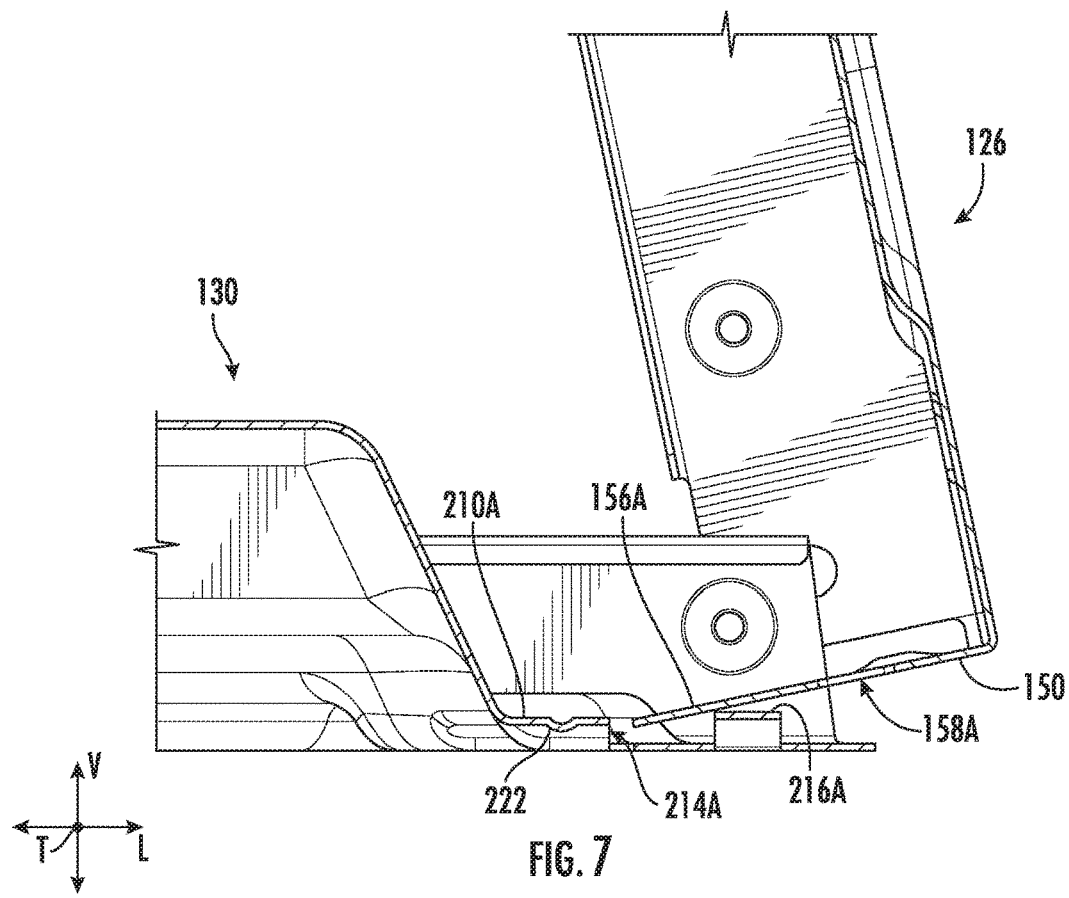
FIG. 7 provides a transverse cross-sectional view of the side panel being connected with the base panel and depicts a locking tab of the side panel oriented for insertion into a tab receiving slot of a first interlock housing of the base panel.
Figure 8:
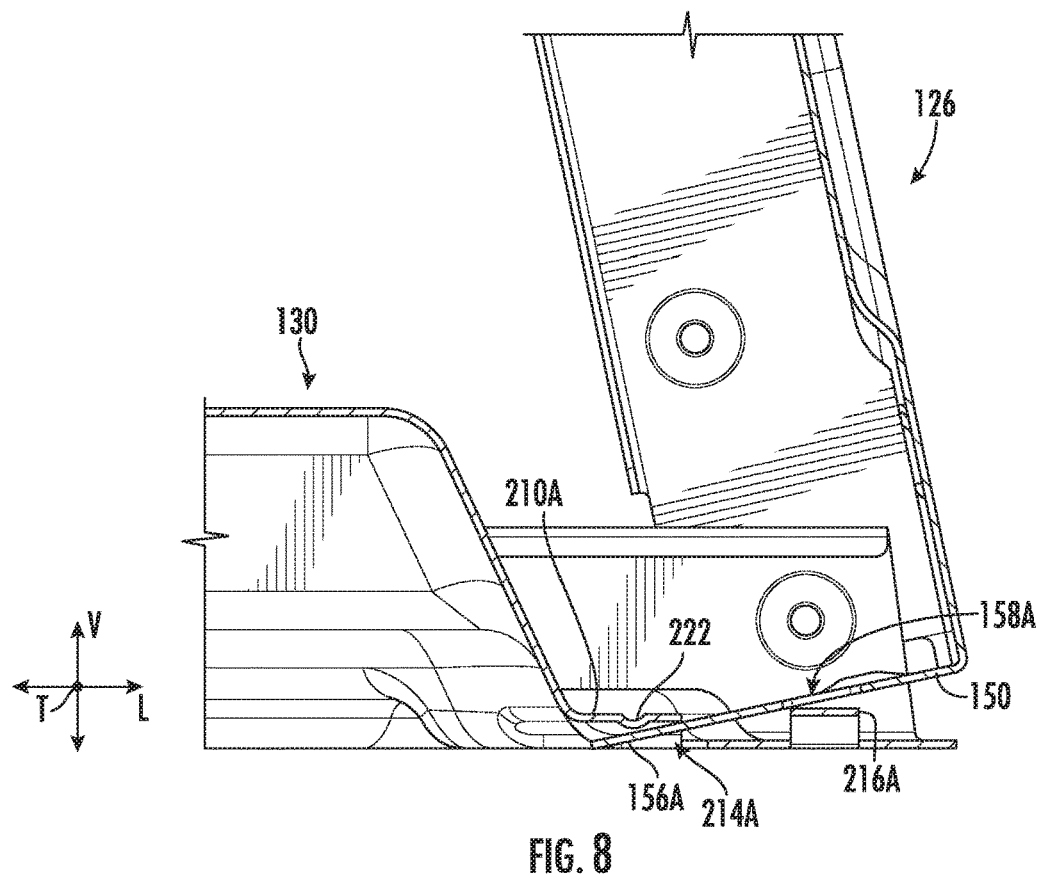
FIG. 8 provides a transverse cross-sectional view of the side panel being connected with the base panel and depicts the locking tab inserted into the tab receiving slot of the interlock housing.

FIG. 6 provides a close up perspective view of one of the interlocking features of base panel 130. Particularly, in FIG. 6, first interlock housing 210A and first interlock projection 216A are depicted. As shown, first interlock housing 210A defines tab receiving slot 214A. Tab receiving slot 214A is an elongated slot that extends longitudinally or lengthwise along the transverse direction T. Stated another way, tab receiving slot 214A extends longitudinally or lengthwise along a direction orthogonal to the insertion direction of first locking tab 156A, which in this example is the lateral direction L. First tab receiving slot 214A is sized to receive first locking tab 156A as noted above. Notably, a roof 220 of first interlock housing 210A is positioned above the top surface 202 of base body 200 (e.g., at first mounting plate 206) along the vertical direction V. A bead 222 projects from roof 220. Particularly, bead 222 projects from roof 220 along a second direction D2, which is a downward direction along the vertical direction V in this embodiment. FIGS. 7 through 9 best depict bead 222 projecting downward along the vertical direction V with respect to roof 220 of first interlock housing 210A. As shown, bead 222 can have a curved surface as viewed from the transverse direction T.

As further shown in FIG. 6, for this embodiment, bead 222 is an elongated bead that extends longitudinally or lengthwise along the transverse direction T. Stated differently, bead 222 extends longitudinally or lengthwise along a direction orthogonal to the insertion direction of first locking tab 156A into tab receiving slot 214A, which in this example is the lateral direction L. In some embodiments, elongated bead 222 extends at least half the transverse length of the tab receiving slot 214A. Furthermore, for this embodiment, elongated bead 222 is centered relative to first tab receiving slot 214A. Bead 222 can be formed in any suitable manner. As one example, bead 222 can be embossed in roof 220 of first interlock housing 210A as shown in FIG. 6.

Interlock projection 216A is gable-shaped in this embodiment. Specifically, interlock projection 216A includes a first ramp 224 and a second ramp 226 that each angle upward along the vertical direction V (i.e., in the first direction D1 along the vertical direction V) to meet at a ridge or apex 228 of interlock projection 216A. That is, interlock projection 216A has two opposing ramped members that form a gable-shaped projection. First interlock projection 216A projects or extends from top surface 202 of base body 200 at first mounting plate 206. Moreover, first ramp 224 and second ramp 226 each extend longitudinally or lengthwise along the transverse direction T, which in this embodiment is a direction orthogonal to the insertion direction of first locking tab 156A (FIG. 3) within first tab receiving slot 214A. In this embodiment, the insertion direction is the lateral direction L. The other interlock projections 216B-D, 218A-D can be configured in the same or similar manner as first interlock projection 216A. Furthermore, although interlock projection 216A is shown having a gable shape in FIG. 6, it will be appreciated that interlock projection 216A (and other interlock projections 216B-d, 218A-D) can have other suitable configurations.

Returning to FIG. 5, a forward flange 240 projects or extends from base body 200 at the front 110 and a rear flange 250 projects or extends from base body 200 at the rear or back 112. Both the forward flange 240 and the rear flange 250 extend from base body 200 in a first direction D1 that corresponds with an upward direction along the vertical direction V. Forward flange 240 and rear flange 250 both extend in a plane orthogonal to the transverse direction T. Forward flange 240 defines one or more fastener openings, including a first side fastener opening 242 defined at the first side 106 of forward flange 240 and a second side fastener opening 244 defined at the second side 108 of forward flange 240. Likewise, rear flange 250 defines one or more fastener openings, including a first side fastener opening 252 defined at the first side 106 of rear flange 250 and a second side fastener opening 254 defined at the second side 108 of rear flange 250.

Forward flange 240 of base panel 130 is connectable with the forward flange 142 of first side panel 126 at the first side 106. For instance, first side fastener opening 242 of forward flange 240 of base panel 130 can be positioned in communication with the fastener opening 170 of forward flange 142 of first side panel 126 (FIG. 3). Then, a fastener (e.g., a screw or bolt) can be threaded or moved through first side fastener opening 242 of forward flange 240 of base panel 130 and through fastener opening 170 of forward flange 142 of first side panel 126 to secure the front portion of first side panel 126 with base panel 130. In addition, first side fastener opening 252 of rear flange 250 of base panel 130 can be positioned in communication with the fastener opening 172 of rear flange 144 of first side panel 126 (FIG. 3). Next, a fastener can be threaded or moved through first side fastener opening 252 of rear flange 250 of base panel 130 and through fastener opening 172 of the rear flange 144 of first side panel 126. In this way, the rear portion of first side panel 126 can be secured with base panel 130. As will be appreciated, second side panel 128 can be connected with the second side 108 of base panel 130 in a similar manner as first side panel 126 is connected with the first side 106 of base panel 130 described above. First side panel 126 and second side panel 128 can be connected with base panel 130 via fasteners as described above after interlocking as described above.

Figure 10:
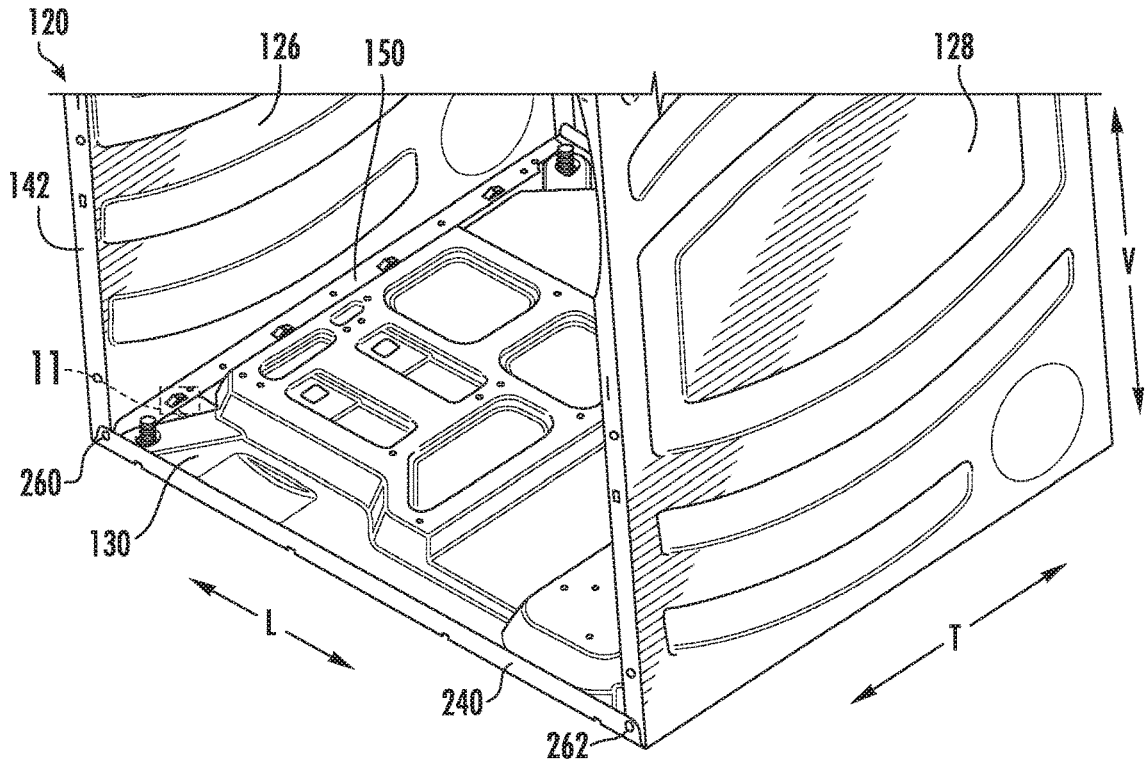
FIG. 10 provides a perspective view of the side panel interlocked with the base panel and fastened thereto.
Figure 11:
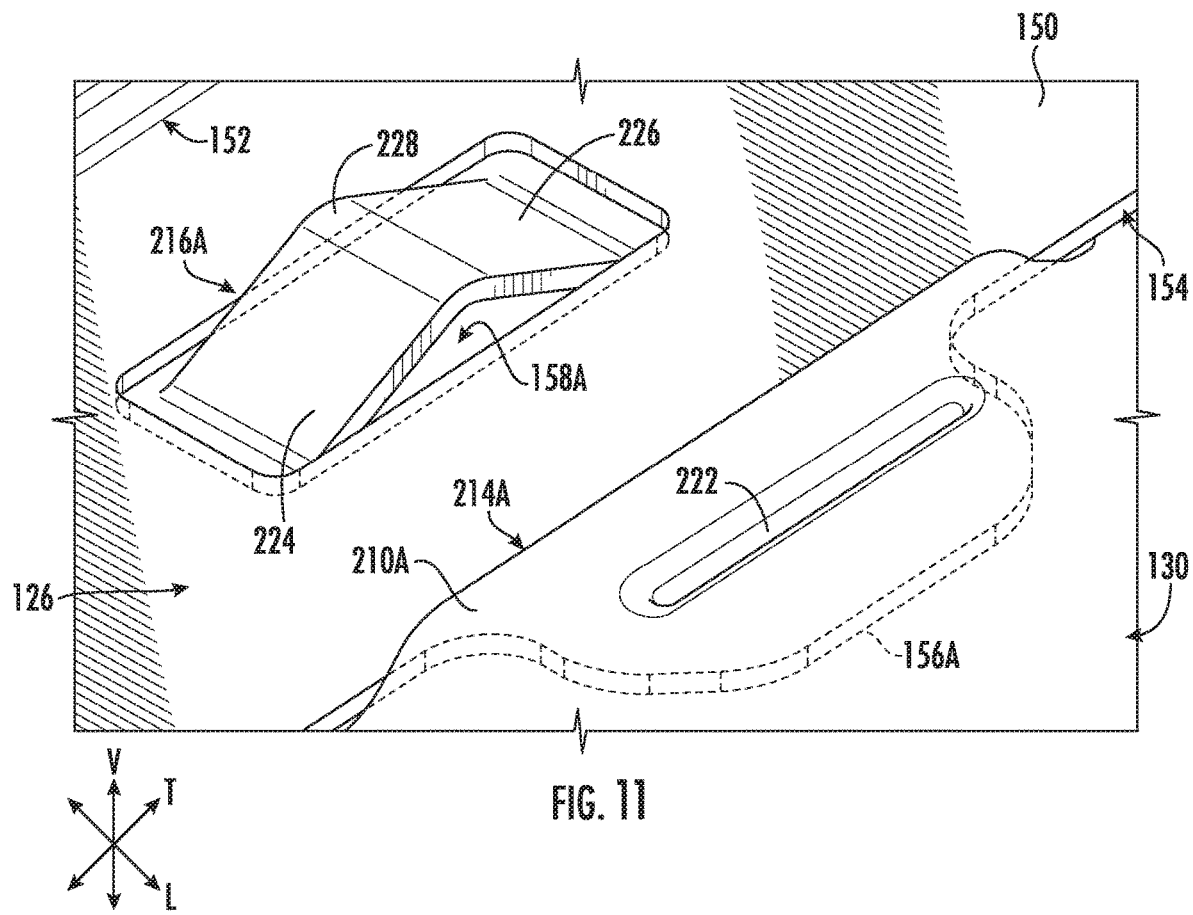
FIG. 11 provides a view of Section 10 of FIG. 10.

With reference now to FIGS. 7 through 11, an example manner in which a side panel (e.g., first side panel 126 and/or second side panel 128) can be connected with base panel 130 will now be described. FIG. 7 provides a transverse cross-sectional view of first side panel 126 being connected with base panel 130 and depicts first locking tab 156A oriented for insertion into first tab receiving slot 214A of first interlock housing 210A. FIG. 8 provides a transverse cross-sectional view of first side panel 126 being connected with base panel 130 and depicts first locking tab 156A inserted into first tab receiving slot 214A of first interlock housing 210A. FIG. 9 provides a transverse cross-sectional view of first side panel 126 interlocked with base panel 130. FIG. 10 provides a perspective view of first side panel 126 interlocked with base panel 130 and fastened thereto as well as second side panel 128 interlocked with base panel 130 and fastened thereto. FIG. 11 provides a view of Section 10 of FIG. 10 and depicts the interlocking features of first side panel 126 and base panel 130.

As shown best in FIG. 7, with the locking tabs 156A-D of first side panel 126 aligned with their respective tab receiving slots 214A-D of base panel 130, e.g., along the transverse direction T, first side panel 126 is oriented at an angle of inclination with respect to a horizontal plane orthogonal to the vertical direction V. In some embodiments, the angle of inclination is between about ten and fifteen degrees) (10-15°). By angling first side panel 126 with respect to the horizontal plane, first locking tab 156A can clear first interlock projection 216A as first locking tab 156A is moved laterally inward toward first tab receiving slot 214A. For instance, as depicted in FIG. 7, first locking tab 156A is shown being inserted into first tab receiving slot 214A whilst clearing first interlock projection 216A.

As shown best in FIG. 8, first locking tab 156A is inserted into first tab receiving slot 214A defined by first interlock housing 210A. Notably, the angle of inclination of first side panel 126 is maintained to clear first interlock projection 216A as noted above downward projecting bead 222 as shown in FIG. 8. In this manner, first locking tab 156A can be readily inserted into first tab receiving slot 214A. When first locking slot 158A is aligned with first interlock projection 216A, e.g., along the lateral direction L and transverse direction T, first side panel 126 can be laid back or moved such that bottom flange 150 of first side panel 126 is oriented substantially along a horizontal plane. That is, first side panel 126 is moved such that the angle of inclination of bottom flange 150 is at or substantially zero degrees (0°).

For instance, as best shown in FIG. 9, first side panel 126 has been laid back such that bottom flange 150 is oriented substantially along a horizontal plane that is orthogonal to the vertical direction V. Notably, when first side panel 126 is laid back, first side panel 126 becomes interlocked with base panel 130. Particularly, as shown, when first locking tab 156A is fully inserted into first tab receiving slot 214A and first side panel 126 is laid back, bead 222 engages first locking tab 156A thereby providing a downward force on first locking tab 156A. In addition, first interlock projection 216A is received within first locking slot 158A defined by bottom flange 150. In this manner, transverse and lateral movement of first side panel 126 relative to base panel 130 is constrained. Moreover, advantageously, with first side panel 126 interlocked with base panel 130, bottom flange 150 is seated on top of base panel 130. Particularly, as shown in FIG. 9, bottom flange 150 is seated on top surface 202 of base body 200 at the first mounting plate 206. By seating bottom flange 150 on base body 200, the load is better or more uniformly distributed across top surface 202 of the base body 200 of base panel 130.

As shown particularly in FIG. 11, first interlock projection 216A is received within and extends through first locking slot 158A. Thus, at least the apex 228 of first interlock projection 216A is positioned vertically above the top surface of bottom flange 150. The angled surfaces of first ramp 224 and second ramp 226 constrain the transverse movement of first side panel 126 relative to base panel 130. For instance, if a transverse force is applied to first side panel 126, first ramp 224 or second ramp 226 will prevent bottom flange 150 from slipping in the transverse direction T. Notably, the ramped or angled surfaces of first ramp 224 and/or second ramp 226 provide a mechanical advantage to counteract the transverse force. In addition, as first interlock projection 216A is positioned vertically above the top surface of bottom flange 150, first interlock projection 216A also constrains bottom flange 150 and thus first side panel 126 in the lateral direction L as well. Furthermore, as noted above, with first locking tab 156A engaged with bead 222, the vertical movement or tipping of first side panel 126 relative to base panel 130 is constrained. It will be appreciated that second side panel 128 can be interlocked with base panel 130 in the same or similar manner described above.

As shown best in FIG. 10, after first side panel 126 is interlocked with base panel 130, optionally, first side panel 126 can be further secured to base panel 130. As depicted, with the fastener opening 170 (FIG. 3) of the forward flange 142 of first side panel 126 aligned with first side fastener opening 242 of the forward flange 240 of base panel 130, a fastener 260 can be inserted through the openings 170, 242 to further secure first side panel 126 with base panel 130. Similarly, although not shown, with the fastener opening 172 (FIG. 3) of the rear flange 144 of first side panel 126 aligned with first side fastener opening 252 (FIG. 5) of the rear flange 250 of base panel 130, a fastener can be inserted through the openings 172, 252 to further secure first side panel 126 with base panel 130. Furthermore, once interlocked with base panel 130, second side panel 128 can be further secured to base panel 130 in the same or similar manner. Particularly, with the fastener opening of the forward flange of second side panel 128 aligned with second side fastener opening 244 of the forward flange 240 of base panel 130, a fastener 262 can be inserted through the openings to further secure second side panel 128 with base panel 130. Similarly, although not shown, with the fastener opening of the rear flange of second side panel 128 aligned with second side fastener opening 254 (FIG. 5) of the rear flange 250 of base panel 130, a fastener can be inserted through the openings to further secure second side panel 128 with base panel 130.

Figure 12:
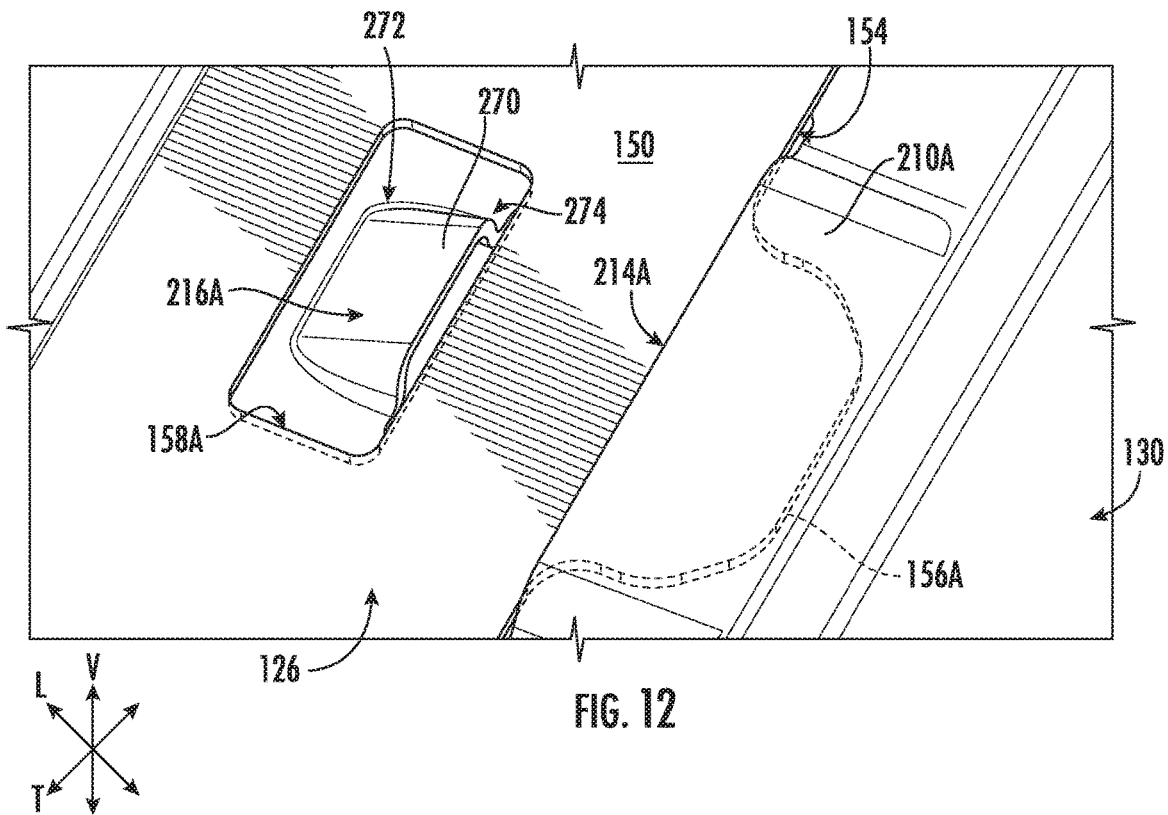
FIG. 12 provides a close up view of a side panel interlocked with a base panel and depicts an interlock projection of the base panel having an alternative configuration.

FIG. 12 provides a close up view of first side panel 126 interlocked with base panel 130 and depicts first interlock projection 216A of base panel 130 having an alternative configuration. For this embodiment, first interlock projection 216A has a ramped roof 270 that is angled with respect to a horizontal plane that is orthogonal to the vertical direction V. Particularly, ramped roof 270 angles upward from a laterally outer end 272 to a laterally inner end 274. Stated differently, laterally inner end 274 is positioned vertically above laterally outer end 272. Thus, ramped roof 270 ramps upward along the vertical direction V as it extends laterally inward along the lateral direction L toward the lateral centerline LC (FIG. 2). The configuration of ramped roof surface 270 facilitates the laying back of first side panel 126 after first locking tab 156A is inserted into first tab receiving slot 214A and provides a secure stop for preventing both lateral movement and tipping of first side panel 126 relative to base panel 130.

Figure 13:
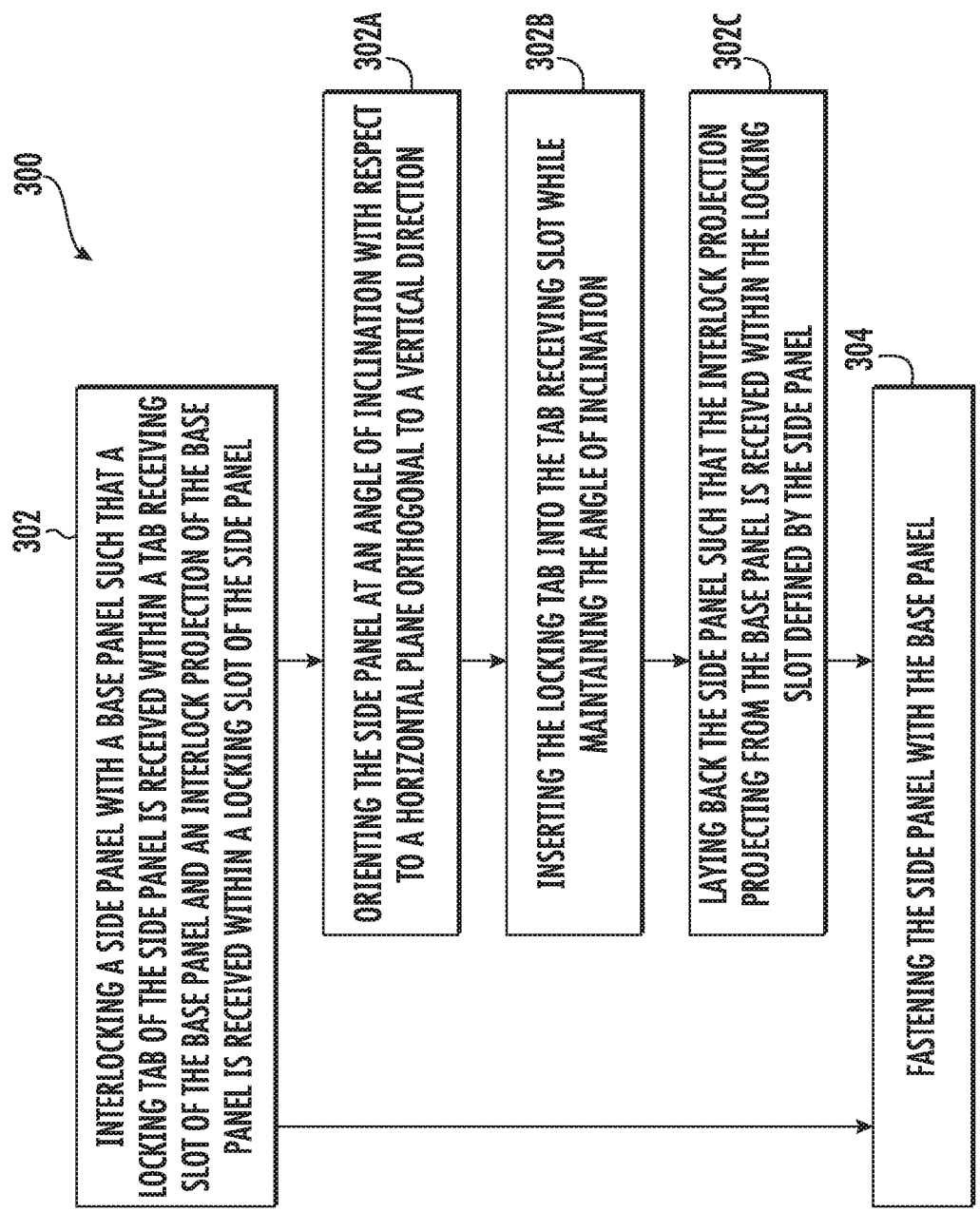
FIG. 13 provides a flow diagram of one example manner in which a side panel can be connected with a base panel according to example embodiments of the present disclosure.

FIG. 13 provides a flow diagram for a method (300) of assembling a cabinet of an appliance. For instance, the method (300) can be implemented to assemble one of the side panels 126, 128 with base panel 130 of cabinet 120 provided above. In addition, it will be appreciated that method (300) can be modified, adapted, expanded, rearranged and/or omitted in various ways without deviating from the scope of the present subject matter. Reference numerals utilized above to denote certain features will be utilized below to provide context to method (300).

At (302), the method (300) includes interlocking a side panel with a base panel such that a locking tab of the side panel is received within a tab receiving slot of the base panel and an interlock projection of the base panel is received within a locking slot of the side panel. For instance, the side panel can be first side panel 126 or second side panel 128 and the base panel can be base panel 130 provided herein. FIG. 11 provides a close up view of first side panel 126 interlocked with base panel 130. Particularly, as shown, first side panel 126 interlocked with base panel 130 such that first locking tab 156A of first side panel 126 is received within first tab receiving slot 214A of base panel 130 and first interlock projection 216A of base panel 130 is received within first locking slot 158A of first side panel 126. In some implementations, in interlocking the side panel with the base panel at (302), the locking tab engages a bead projecting from an interlock housing defining the tab receiving slot. For instance, as shown in FIG. 9, first locking tab 156A engages bead 222 projecting from interlock housing 210A defining first tab receiving slot 214A.

Furthermore, in some implementations, the base panel has a mounting plate from which the interlock projection projects. For instance, as shown in FIG. 5, base panel 130 has first mounting plate 206 extending longitudinally along the transverse direction T at first side 106. As shown, first interlock projection 216A projects therefrom, and in addition, a plurality of interlock projections 216A, 216B, 216C, 216D project from first mounting plate 206. In such implementations, in interlocking the side panel with the base panel, a bottom flange of the side panel is seated at least in part on a top surface of the mounting plate of the base panel. For instance, as shown best in FIG. 9, bottom flange 150 of first side panel 126 is seated at least in part on top surface 202 of first mounting plate 206 of base panel 130.

In some implementations, interlocking the side panel with the base panel at (302) includes, orienting the side panel at an angle of inclination with respect to a horizontal plane orthogonal to a vertical direction at (302A). For instance, as shown in FIG. 7, first side panel 126 is oriented at an angle of inclination with respect to a horizontal plane orthogonal to the vertical direction V. First side panel 126 can be oriented at an angle of inclination with respect to the horizontal plane orthogonal to the vertical direction V between about ten and fifteen degrees (10-15°). By angling first side panel 126 with respect to the horizontal plane, first locking tab 156A can clear first interlock projection 216A as first locking tab 156A is moved laterally inward toward first tab receiving slot 214A. For instance, as shown in FIG. 7, first locking tab 156A is shown being inserted into first tab receiving slot 214A whilst clearing first interlock projection 216A.

Further, in some implementations, interlocking the side panel with the base panel at (302) includes inserting the locking tab into the tab receiving slot while maintaining the angle of inclination at (302B). For instance, as shown in FIG. 8, first locking tab 156A is inserted into first tab receiving slot 214A while the angle of inclination of first side panel 126 is maintained.

In addition, in some implementations, interlocking the side panel with the base panel at (302) includes laying back the side panel such that the interlock projection projecting from the base panel is received within the locking slot defined by the side panel at (302C). For instance, as shown in FIG. 8, once first locking slot 158A is aligned with first interlock projection 216A along the lateral direction L (and transverse direction T), first side panel 126 can be laid back (i.e., reoriented such that the angle of inclination of bottom flange 150 is at or substantially zero (0)) such that first interlock projection 216A projecting from base panel 130 is received within first locking slot 158A defined by first side panel 126, e.g., as shown in FIGS. 9 and 11.

At (304), the method (300) includes, optionally, fastening the side panel with the base panel. In some implementations, fastening the side panel with the base panel includes i) fastening a forward flange of the side panel with a forward flange of the base panel; and ii) fastening a rear flange of the side panel with a rear flange of the base panel. For instance, as shown in FIG. 10, fastener 260 is shown fastening forward flange 142 of first side panel 126 with forward flange 240 of base panel 130. A fastener can likewise fasten rear flange 144 of first side panel 126 with rear flange 250 of base panel 130 (FIG. 5). In this way, first side panel 126 can be interlocked with base panel 130 as well as fastened thereto.

In some implementations, the method (300) further includes, optionally, interlocking one or more other side panels with the base panel. The one or more other side panels can be interlocked with the base panel in the same or similar manner described above. For instance, second side panel 128 can be interlocked with base panel 130 as shown in FIG. 10. Further, in some implementations, the one or more other panels interlocked with base panel 130 can be fastened with base panel 130 in the same or similar manner described above at (304). For instance, as shown in FIG. 10, fastener 262 is shown fastening the forward flange of second side panel 128 with forward flange 240 of base panel 130. A fastener can likewise fasten the rear flange of second side panel 128 with rear flange 250 of base panel 130 (FIG. 5). In this way, second side panel 128 can be interlocked with base panel 130 as well as fastened thereto.

Figure 14:
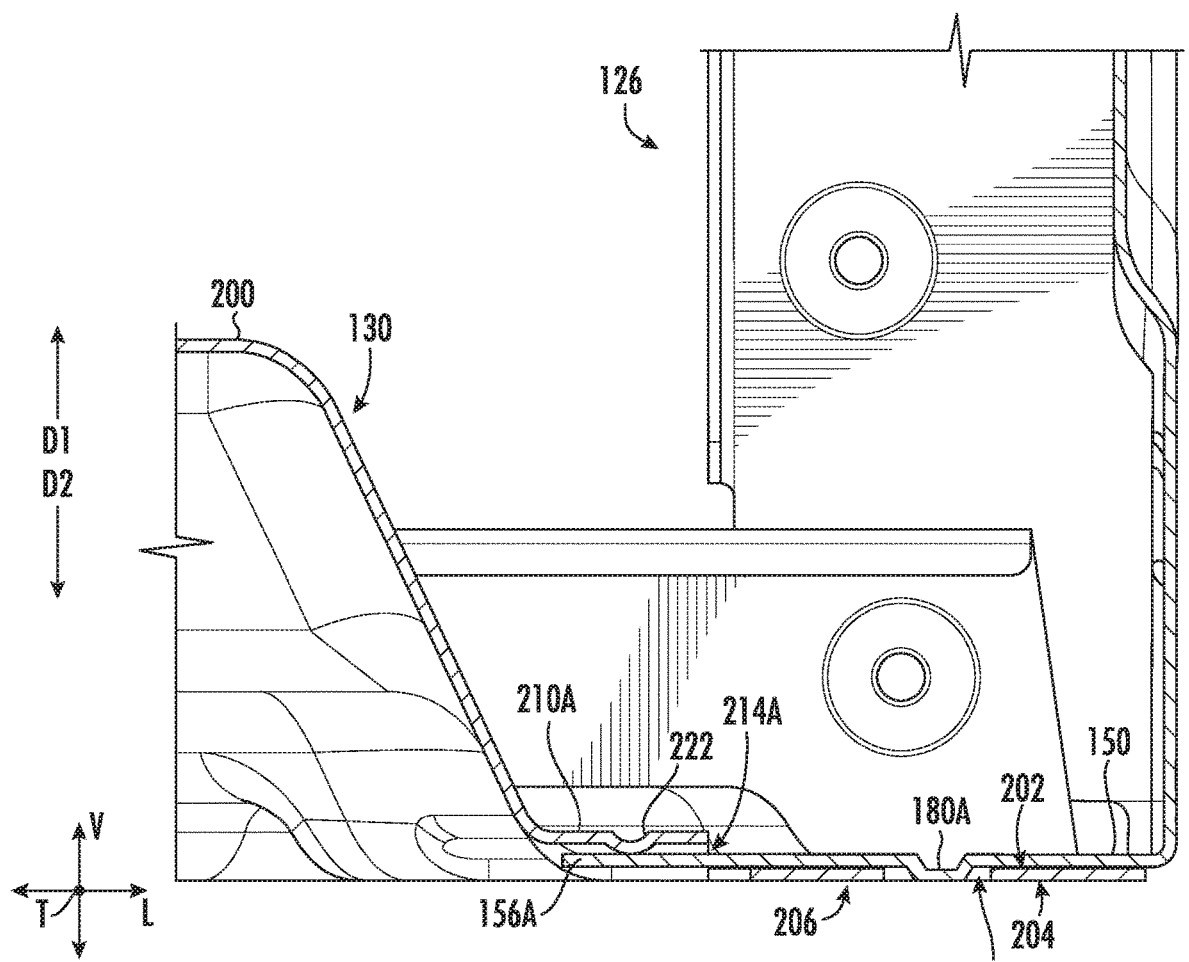
FIG. 14 provides a transverse cross-sectional view of a side panel interlocked with a base panel according to example embodiments of the present disclosure.

FIG. 14 provides a transverse cross-sectional view of a side panel 126 interlocked with a base panel 130 according to example embodiments of the present disclosure. For this embodiment, base panel 130 includes interlock housings positioned along the first mounting plate 206 at the first side, including first interlock housing 210A as shown in FIG. 14. Base panel 130 can include a second interlock housing, a third interlock housing, and a fourth interlock housing as well. Further, base panel 130 can include four (4) interlock housings positioned along the second mounting plate at the second side. The interlock housings of the base panel 130 of FIG. 14 can be spaced from one another in the same or similar manner as the interlock housings 210A-D, 212A-D shown in FIG. 5. Each interlock housing defines a tab receiving slot. For instance, first interlock housing 210A defines a first tab receiving slot 214A as depicted in FIG. 14. Each tab receiving slot can receive a corresponding locking tab of a side panel. For instance, first locking tab 156A is shown received within tab receiving slot 214A of first interlock housing 210A.

Notably, for this embodiment, bottom flange 150 of first side panel 126 does not define locking slots; rather, first mounting plate 206 of base body 200 defines a plurality of receiving slots, including first receiving slot 280A depicted in FIG. 14. Each receiving slot, including first receiving slot 280A, extends through first mounting plate 206 between top surface 202 and bottom surface 204. Each receiving slot can be aligned with their associated interlock housings along the transverse direction T. Further, for this embodiment, bottom flange 150 includes a plurality of interlock projections projecting along the second direction D2, or downward along the vertical direction V. For instance, as shown in FIG. 14, a first interlock projection 180A is shown projecting along the second direction D2 from bottom flange 150. As depicted, when first side panel 126 is interlocked with base panel 130, first interlock projection 180A is received within first receiving slot 280A. Although not shown, the other interlock projections of first side panel 126 can likewise be received within their respective receiving slots to interlock first side panel 126 with base panel 130. When the interlock projections of first side panel 130 are received within their respective receiving slots, first side panel 126 is constrained relative to base panel 130 along the lateral direction L and transverse direction T. Second side panel 128 (FIG. 1) can be interlocked with base panel 130 in a similar manner.

Figure 15:
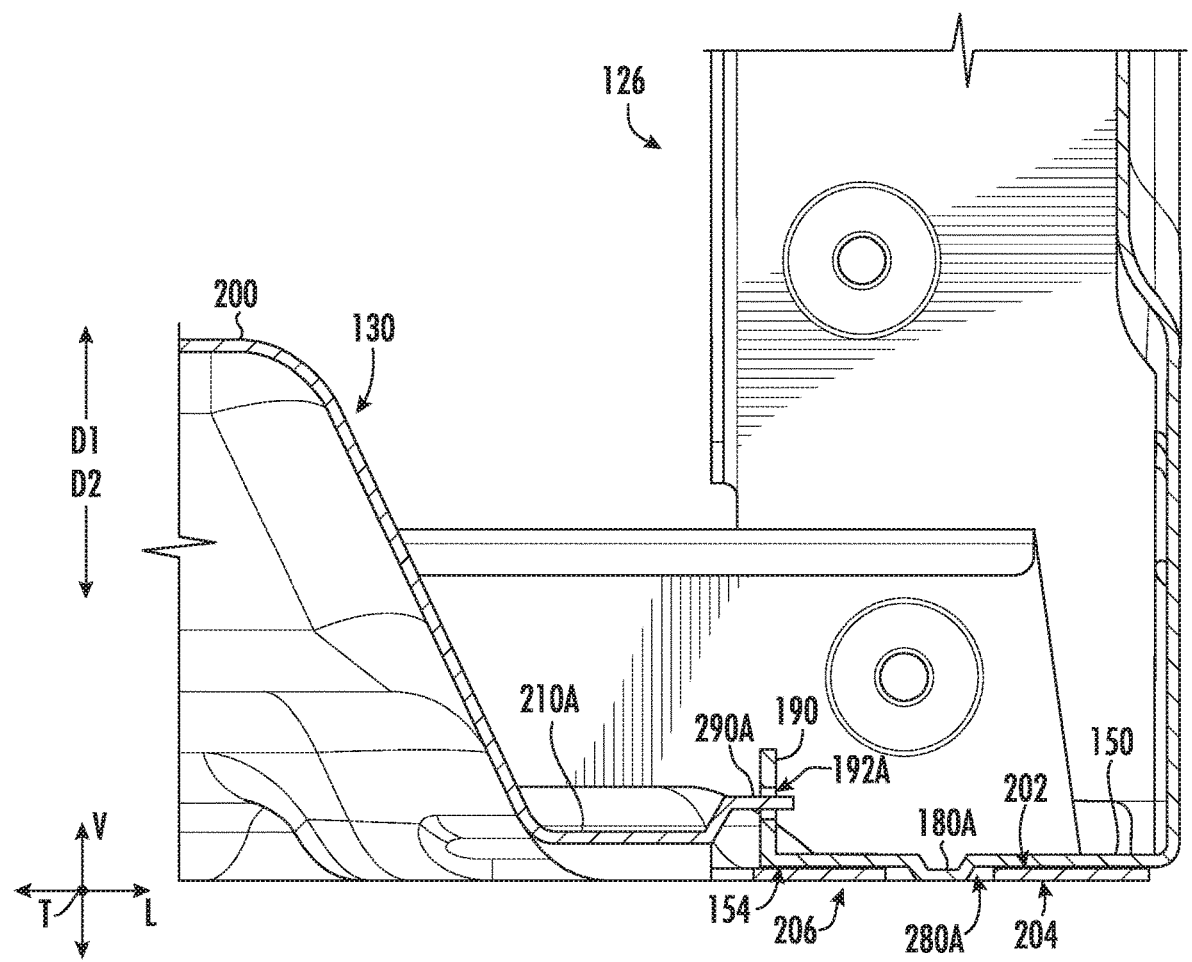
FIG. 15 provides a transverse cross-sectional view of a side panel interlocked with a base panel according to example embodiments of the present disclosure.

FIG. 15 provides a transverse cross-sectional view of a side panel 126 interlocked with a base panel 130 according to example embodiments of the present disclosure. For this embodiment, like the embodiment of FIG. 14, first side panel 126 includes interlock projections, including first interlock projection 180A, that are receivable within respective receiving slots defined by first mounting plate 206 of base body 200 of base panel 130. For instance, first interlock projection 180A is shown received within first receiving slot 280A.

Notably, for this embodiment, first side panel 126 includes an interlock flange 190 projecting from bottom flange 150 at its distal end 154. Interlock flange 190 projects from bottom flange 150 along the first direction D1 or upward along the vertical direction V as shown in FIG. 15. Interlock flange 190 defines a plurality of tab receiving slots, including a first tab receiving slot 192. The tab receiving slots can be spaced from one another along the transverse direction T, e.g., in a similar manner as the tab receiving slots 214A-D are spaced as shown in FIG. 5. In addition, base body 200 of base panel 130 includes a plurality of interlocking tabs projecting from each of the interlock housings. For instance, as shown in FIG. 15, a first interlocking tab 290A is shown projecting from first interlock housing 210A. Each interlock tab projects generally horizontally and laterally outward from their respective interlock housings. In this manner, when first side panel 126 is interlocked with base panel 130, the interlock tabs are received within their respective or associated tab receiving slots defined by interlock flange 190 of first side panel 126. For instance, first interlocking tab 290A is shown received within first tab receiving slot 192 of interlock flange 190 in FIG. 15. When first interlocking tab 290A is received within first tab receiving slot 192, and more generally when the interlocking tabs of base panel 130 are received within their respective tab receiving slots defined by interlock flange 190 of first side panel 126, first side panel 126 is constrained relative to base panel 130 along the vertical direction V and transverse direction T, while the interlock projections received within their respective receiving slots constrain base panel 130 relative to first side panel 126, or vice versa, along the lateral direction L and transverse direction T. Second side panel 128 (FIG. 1) can be interlocked with base panel 130 in a similar manner.

Figure 16:
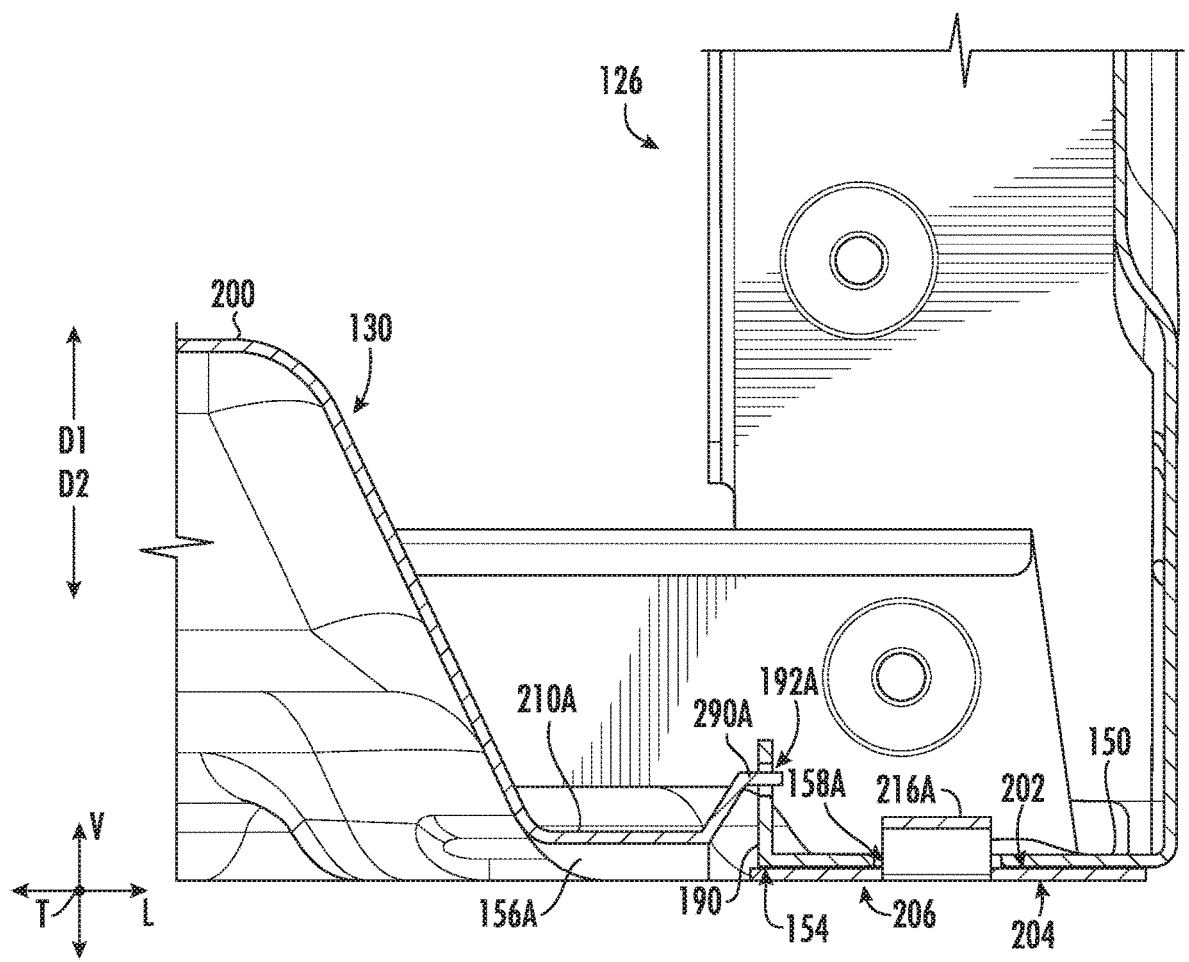
FIG. 16 provides another transverse cross-sectional view of a side panel interlocked with a base panel according to example embodiments of the present disclosure.

FIG. 16 provides a transverse cross-sectional view of a side panel 126 interlocked with a base panel 130 according to example embodiments of the present disclosure. For this embodiment, like the embodiment of FIG. 15, first side panel 126 includes interlock flange 190 defining a plurality of tab receiving slots, including first tab receiving slot 192 as shown in FIG. 16. Each of the tab receiving slots are sized and configured to receive a respective interlocking tab. For instance, as depicted in FIG. 16, first interlocking tab 290A is received within first tab receiving slot 192. Further, for this embodiment, base panel 130 includes a plurality of interlock projections, including first interlock projection 216A. Each interlock projection can be received within a respective locking slot defined by bottom flange 150. For instance, as shown in FIG. 16, first interlock projection 216A is shown projecting through and received by first locking slot 158A. Second side panel 128 (FIG. 1) can be interlocked with base panel 130 in a similar manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
a cabinet having a base panel and a side panel connected with the base panel;
the base panel having a base body that has a top surface and a bottom surface, an interlock housing defining a tab receiving slot, and an interlock projection projecting from the top surface;
the side panel having a panel body and a mounting flange extending from the panel body, the mounting flange defining a locking slot and having a locking tab extending therefrom; and
a bead projecting from the interlock housing and engaging the locking tab;
wherein the locking tab of the side panel is received within the tab receiving slot of the interlock housing of the base panel and the interlock projection is received within the locking slot of the mounting flange of the side panel.

2. The appliance of claim 1, wherein the bead is elongated and extends longitudinally orthogonal to an insertion direction of the locking tab into the tab receiving slot.

3. The appliance of claim 1, wherein the base body has a mounting plate from which the interlock projection projects, and wherein the mounting flange of the side panel is at least in part seated on and substantially flush with the top surface of the mounting plate of the base body.

4. The appliance of claim 1, wherein the interlock projection is gable-shaped.

5. The appliance of claim 1, wherein the appliance defines a vertical direction, a lateral direction, and a transverse direction, and wherein the locking tab is one of a plurality of locking tabs extending from the mounting flange of the side panel and the locking slot is one of a plurality of locking slots defined by the mounting flange, and wherein the interlock housing is one of a plurality of interlock housings of the base panel, each interlock housing defining a tab receiving slot, and wherein the interlock projection is one of a plurality of interlock projections projecting from the top surface of the base body, and
wherein each of the plurality of locking tabs of the side panel is received within a respective one of the tab receiving slots of the plurality of interlock housings of the base panel and each of the plurality of interlock projections is received within a respective one of the plurality of locking slots defined by the mounting flange of the side panel.

6. The appliance of claim 5, wherein the base panel defines a lateral centerline, and wherein each one of the plurality of interlock housings has an associated interlock projection of the plurality of interlock projections, and wherein each one of the plurality of interlock housings is positioned inward of the associated interlock projection along the lateral direction with respect to the lateral centerline.

7. The appliance of claim 1, wherein the appliance is a dryer appliance.

8. An appliance defining a vertical direction, a lateral direction, a transverse direction, the appliance comprising:
a base panel having a base body, the base body has an interlock housing defining a tab receiving slot and an interlock projection projecting from the base body along the vertical direction, the interlock housing having a bead projecting downward along the vertical direction into the tab receiving slot;
a side panel having a panel body and a bottom flange extending from the panel body, the bottom flange defining a locking slot and having a locking tab extending therefrom, and
wherein the locking tab of the side panel is received within the tab receiving slot of the interlock housing of the base panel and engaged with the bead and wherein the interlock projection is received within the locking slot of the bottom flange of the side panel.

9. The appliance of claim 8, wherein the base body has a mounting plate from which the interlock projection projects, and wherein the bottom flange of the side panel is at least in part seated on and substantially flush with the mounting plate of the base body.

10. The appliance of claim 9, wherein the interlock housing has a roof that extends above the mounting plate along the vertical direction, and wherein the bead projects from the roof downward along the vertical direction to engage the locking tab received within the tab receiving slot.

11. The appliance of claim 8, wherein the interlock housing and the interlock projection are aligned along transverse direction.

12. The appliance of claim 8, wherein the locking tab and the locking slot are aligned along transverse direction.

13. The appliance of claim 8, wherein the interlock projection has a ramped roof that extends from a laterally outer end to a laterally inner end, the laterally outer end being positioned outward of the laterally inner end along the lateral direction with respect to a lateral centerline defined by the cabinet, and wherein the ramped roof ramps upward along the vertical direction as the ramped roof extends laterally inward along the lateral direction toward the lateral centerline.

14. The appliance of claim 8, wherein the bottom flange extends along the lateral direction between a proximal end and a distal end, wherein the proximal end connects the bottom flange with the panel body and the distal end is a free end, and wherein the locking tab extends from the distal end of the bottom flange.

15. A method of assembling a cabinet of an appliance, the method comprising:
interlocking a side panel with a base panel such that a locking tab of the side panel is received within a tab receiving slot of the base panel and an interlock projection of the base panel is received within a locking slot of the side panel, wherein in interlocking the side panel with the base panel, the locking tab engages a bead projecting from an interlock housing defining the tab receiving slot.

16. The method of claim 15, wherein interlocking the side panel with the base panel comprises:
orienting the side panel at an angle of inclination with respect to a horizontal plane orthogonal to a vertical direction;
inserting the locking tab into the tab receiving slot while maintaining the angle of inclination;
laying back the side panel such that the interlock projection projecting from the base panel is received within the locking slot defined by the side panel.

17. The method of claim 15, wherein the base panel has a mounting plate from which the interlock projection projects, and wherein in interlocking the side panel with the base panel, a bottom flange of the side panel is seated at least in part on a top surface of the mounting plate of the base panel.

18. The method of claim 15, further comprising:
fastening the side panel with the base panel, wherein fastening the side panel with the base panel comprises:

fastening a forward flange of the side panel with a forward flange of the base panel; and fastening a rear flange of the side panel with a rear flange of the base panel.

\* \* \* \* \*